United States Patent
Wernet et al.

(10) Patent No.: US 10,281,312 B2
(45) Date of Patent: May 7, 2019

(54) METHOD AND APPARATUS FOR MONITORING A PREDEFINED FILLING LEVEL OF A MEDIUM IN A CONTAINER

(71) Applicant: Endress + Hauser GmbH + Co. KG, Maulburg (DE)

(72) Inventors: Armin Wernet, Rheinfelden (DE); Gerd Bechtel, Steinen (DE); Kaj Uppenkamp, Wehr (DE); Franco Ferraro, Schworstadt (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 343 days.

(21) Appl. No.: 14/771,841

(22) PCT Filed: Feb. 17, 2014

(86) PCT No.: PCT/EP2014/052982
§ 371 (c)(1),
(2) Date: Sep. 1, 2015

(87) PCT Pub. No.: WO2014/131639
PCT Pub. Date: Sep. 4, 2014

(65) Prior Publication Data
US 2016/0018248 A1    Jan. 21, 2016

(30) Foreign Application Priority Data
Mar. 1, 2013   (DE) ........................ 10 2013 102 055

(51) Int. Cl.
*G01F 23/24*   (2006.01)
*G01F 23/26*   (2006.01)

(52) U.S. Cl.
CPC .......... *G01F 23/263* (2013.01); *G01F 23/241* (2013.01); *G01F 23/243* (2013.01); *G01F 23/265* (2013.01); *G01F 23/266* (2013.01)

(58) Field of Classification Search
CPC ...................................................... G01F 23/263
(Continued)

(56) References Cited

U.S. PATENT DOCUMENTS

| 4,188,826 A * | 2/1980 | Kankura ................. G01F 23/24 |
| | | 73/304 R |
| 5,992,231 A | 11/1999 | Mulder |

(Continued)

FOREIGN PATENT DOCUMENTS

| CN | 101523166 A | 9/2009 |
| CN | 102203570 A | 9/2011 |

(Continued)

OTHER PUBLICATIONS

Fatzer et al. Machine Translation of EP1067368. Published Jan. 2001. Accessed Jan. 2017.*

(Continued)

*Primary Examiner* — Walter L Lindsay, Jr.
*Assistant Examiner* — Philipmarcus T Fadul
(74) *Attorney, Agent, or Firm* — Bacon & Thomas, PLLC (57) ABSTRACT

A method and an apparatus for monitoring a set fill level of a medium in a container using a fill level measuring probe that is designed to operate as a conductive fill level measuring probe in a conductive operating mode and as a capacitive fill level measuring probe in a capacitive operating mode, with a control/evaluation/output unit that is designed to alternately trigger conductive operating mode and capacitive operating mode, and with a control/evaluation/output unit that determines whether the set fill level of the medium in the container has been reached on the basis of the measured values from the two operating modes, and which generates a message when the set fill level is exceeded and/or undershot.

4 Claims, 5 Drawing Sheets

(58) Field of Classification Search
USPC ...................................................... 73/304 C
See application file for complete search history.

(56) References Cited

U.S. PATENT DOCUMENTS

| | | | |
|---|---|---|---|
| 6,481,276 B1 | 11/2002 | Neuhaus | |
| 6,823,271 B1 | 11/2004 | Foss | |
| 9,146,145 B2 | 9/2015 | Wernet | |
| 2008/0297177 A1* | 12/2008 | Dreyer | G01F 25/0061 324/690 |
| 2010/0005880 A1* | 1/2010 | Dieterle | G01F 23/26 73/304 R |
| 2011/0276281 A1 | 11/2011 | Wernet | |

FOREIGN PATENT DOCUMENTS

| | | |
|---|---|---|
| CN | 202693070 U | 1/2013 |
| DE | 3212434 C2 | 10/1983 |
| DE | 19808940 A1 | 10/1998 |
| DE | 10037715 A1 | 2/2002 |
| DE | 102006047780 A1 | 4/2008 |
| DE | 102008043412 A1 | 6/2010 |
| EP | 1067368 A1 | 1/2001 |
| GB | 2117910 B | 10/1983 |

OTHER PUBLICATIONS

"The Authoritative Dictionary of IEEE Standards Terms" (IEEE 100) (seventh ed.). p. 850. Piscataway, New Jersey: IEEE Press. 2000.*

German Search Report, German PTO, Munich, DE, dated Sep. 10, 2013.

International Search Report, EPO, The Netherlands, dated Jul. 18, 2014.

English Translation of the International Preliminary Report on Patentability, WIPO, Geneva, CH, dated Sep. 11, 2015.

* cited by examiner

METHOD AND APPARATUS FOR MONITORING A PREDEFINED FILLING LEVEL OF A MEDIUM IN A CONTAINER

TECHNICAL FIELD

The invention relates to a method and an apparatus for monitoring a predefined filling level of a medium in a container.

BACKGROUND DISCUSSION

German Patent, DE 32 12 434 C2 discloses monitoring the filling level of a medium by detecting whether the electrically conductive medium generates an electrical contact between a sensor electrode and the walls of a conductive container or a second electrode. Since there is frequent build-up on the measuring probe depending on the medium to be monitored, a guard electrode is used. This electrode surrounds the sensor electrode coaxially and has the same electrical potential as the sensor electrode. Depending on the nature of the build-up, this embodiment poses the problem of generating a suitable guard signal.

German Patent, DE 10 2006 047 780 A1 describes a filling level measuring probe which is insensitive to build-up over a large measuring range. According to the known solution, an amplification unit and a limiting element are provided, with the limiting element being arranged between the output of the amplification unit and the guard electrode. The guard electrode is supplied with a guard signal via the amplification unit and the limiting element, which may, for instance, be an Ohmic resistance. Similarly, the sensor electrode is supplied with the triggering signal. An evaluation unit monitors the filling level starting from the current signal available at the sensor electrode and the triggering signal and/or the guard signal. The amplification unit generating the guard signal is limited by the limiting element. The signal with a limited amplitude is passed on to the sensor electrode as an excitation signal. Next, the sensor electrode picks off a current signal which, together with the triggering signal or the guard signal, is used to monitor the filling level.

In German Patent, DE 10 2008 043 412 A1, a filling level switch with a memory unit is described, with the memory unit saving threshold values for various media stored in a container. When the threshold value for the medium is exceeded or undershot, a switch signal is generated. The threshold level can especially be specified for the measured value with regard to the medium in the container in such a way that build-up does not influence reliable switching. Since build-up distorts the measuring signal and thus renders an incorrect process variable, the threshold value (that determines the switch point) is preferably set in such a way that it is outside the range of the measuring signal that can be reached by build-up. The apparatus in such case may be designed as a capacitive or a conductive filling level meter. Since the apparatus can automatically adjust to various media (e.g. also in the context of cleaning cycles such as CIP and SIP processes) in the container by determining and/or calculating the ideal switch point from the detected characteristics of the media, complex comparison processes usually required upon the change of a medium are not necessary.

The detection of the filling level by a conductive measuring procedure reaches its limits if the medium to be monitored has almost no electrical conductivity (<0.5 µS/cm), or very low electrical conductivity. Any changes in the conductivity of the medium compared to the conductivity of air is then too small to be reliably detected by the measuring electronics. Media that are difficult to monitor using a conductive measuring method include, e.g. distilled water, molasses or alcohols. Other problematic media are those with an electrical conductivity of less than 1 µS/cm and a relative permittivity of less than 20. Oils and fats lie especially in this range.

SUMMARY OF THE INVENTION

The object of this invention is to present a method and an apparatus that reliably monitor the filling level of a medium in a container, even of media with very low electrical conductivity.

With regard to the method, the object is achieved by operating a filling level measuring probe in a conductive operating mode as a conductive filling level measuring probe, and in a capacitive operating mode as a capacitive filling level measuring probe, such that the conductive operating mode and the capacitive operating mode are alternately activated, that the measured values in the two operating modes are used to determine whether the set filling level of the medium in the container has been reached, and that a message is generated when the set filling level is exceeded and/or undershot.

For this purpose, the conductive measuring method is used for conductive media, while the capacitive measuring method is used for non-conductive or poorly conductive media. According to the invention, this combines the advantages of the conductive measuring method and those of the capacitive measuring method. This allows a reliable base level detection for an extended range of media. In turn, this dramatically increases the application range of a level detector. One advantage of this is that all advantages and disadvantages of the conductive measuring method and the capacitive measuring method in critical ranges run counter to each other and thus largely compensate each other. Using the method according to the invention especially allows the filling level of media to be detected—independently of their electrical characteristics—with a permittivity of more than 1.5.

A conductive measuring method is preferably used for monitoring media if the media to be monitored have an electrical conductivity of >5 µS/cm. The advantage of the conductive measuring method is that the sensor electrodes may have a direct link to the medium. It is not necessary to insulate the sensor electrodes.

One disadvantage of the capacitive measuring method is that insulation between the sensor electrode and the medium is required for any electrical conductivity of more than 100 µS/cm. The impedance of the insulation proves to have adverse effects as soon as build-up occurs.

In an advantageous embodiment of the method according to the invention, the filling level measuring probe is assigned information that establishes a functional relationship between the measured values from the filling level probe, or variables derived from the measured values of the filling level probe, and at least one media-specific characteristic of the medium. The functional relation defines switch points corresponding to exceeding and/or falling below of the set filling level.

In order for the measuring operation to run automatically and without intervention from the operating staff, the procedure preferably starts with determining the media-specific characteristic in a conductive operating mode. Then, the associated switch point is determined on the basis of the determined media characteristic and the functional relation. The media-specific characteristic which is preferably used is electrical conductivity with L=1/R, with R being the Ohmic resistance of the medium, or permittivity is used.

In an advantageous embodiment of the method according to the invention, the measured values of the filling level measuring probe for monitoring the set filling level and the associated switch point are provided depending on the determined media-specific characteristic in conductive operating mode and/or capacitive operating mode.

The medium range depending on electrical conductivity or permittivity can in particular be divided into three subranges:

measured values are determined in capacitive operating mode for media to be monitored that are not conductive, or have low electrical conductivity, especially below 5 µS/cm.

measured values are determined in conductive operating mode for media to be monitored that have high electrical conductivity, especially above 100 µS/cm.

for media to be monitored whose conductivity is in a middle range, especially above 5 µS/cm and lower than 100 µS/cm, both measuring values are used that are determined in conductive operating mode and in capacitive measuring mode. The measured values are assigned appropriate weighting factors depending on the conductivity of the medium to be monitored. The weighting factors are in the range of 0% to 100% and run counter to each other:

the higher the conductivity, the higher the weighting factor for the measured values determined in conductive operating mode, and the smaller the weighting factor for the measured values determined in capacitive operating mode.

the smaller the conductivity, the higher the weighting factor for the measured values determined in capacitive operating mode, and the smaller the weighting factor for the measured values determined in conductive operating mode.

According to an advantageous further development of the method according to the invention, the measured values determined in capacitive operating mode are compared to the measured values determined in conductive operating mode in the intermediate range. A plausibility check is executed on the basis of the comparison. In this context, it should be noted that the capacitive measurement is not required for a highly conductive medium since there is no additional information provided by a capacitive measurement. Rather, the capacitive measurement then always shows a full-scale deflection. In turn, a conductive measurement is not required for low electrical conductivity since no additional information may be gained in this case as well by such measurement.

According to the invention, the apparatus in conductive operating mode is operated as a conductive filling level measuring probe, and in capacitive operating mode as a capacitive filling level measuring probe. For this purpose, the apparatus according to the invention has a control that is designed to alternately trigger conductive operating mode and capacitive operating mode. Furthermore, an evaluation/output unit is provided that, on the basis of the measured values from the two operating modes, determines whether the set filling level of the medium in the container is reached, and that generates a message if the set filling level is exceeded and/or undershot.

The filling level measuring probe preferably has an assigned memory unit in which information is saved that provides a functional relation between at least one media-specific characteristic of the medium and the measured values of the filling level measuring probe or variables derived from the measured values of the filling level measuring probe, with the functional relation determining the switch points for the evaluation/output unit.

According to an advantageous embodiment of the apparatus according to the invention, the filling level measuring probe has a sensor electrode and a guard electrode. In addition, a first electronic unit and a second electronic unit are provided that are designed so that the first electronic unit operates the filling level measuring probe in conductive operating mode, while a second electronic unit operates the filling level measuring probe in capacitive operating mode. Subsequently, a switch unit activated by the controls then alternately actuates the conductive and capacitive operating modes.

The filling level measuring probe preferably has a guard electrode, and depending on the triggered operating mode, the first electronic unit or the second electronic unit provide the sensor electrode with a control signal and the guard electrode with a guard signal.

Based on a resulting signal that can be tapped at the sensor electrode and the control signal and/or the guard signal, the evaluation unit determines whether the set filling level is exceeded and/or undershot. In particular, at least one measuring resistor is provided by means of which the ration of guard current to sensor electrode current is tapped. According to an advantageous embodiment of the apparatus according to the invention, the evaluation unit determines at least a gain from the control signal and/or the guard signal and the current signal and/or a voltage signal depending on the current signal. Subsequently, any exceeding and/or undershooting of the filling level of the medium in the container is determined on the basis of the gain.

BRIEF DESCRIPTION OF THE DRAWINGS

The invention will be further explained with reference to the following figures.

FIG. 2b: shows a cross section of the filling level measuring probe shown in FIG. 2a;

DETAILED DISCUSSION IN CONJUNCTION WITH THE DRAWINGS

Figure 1:
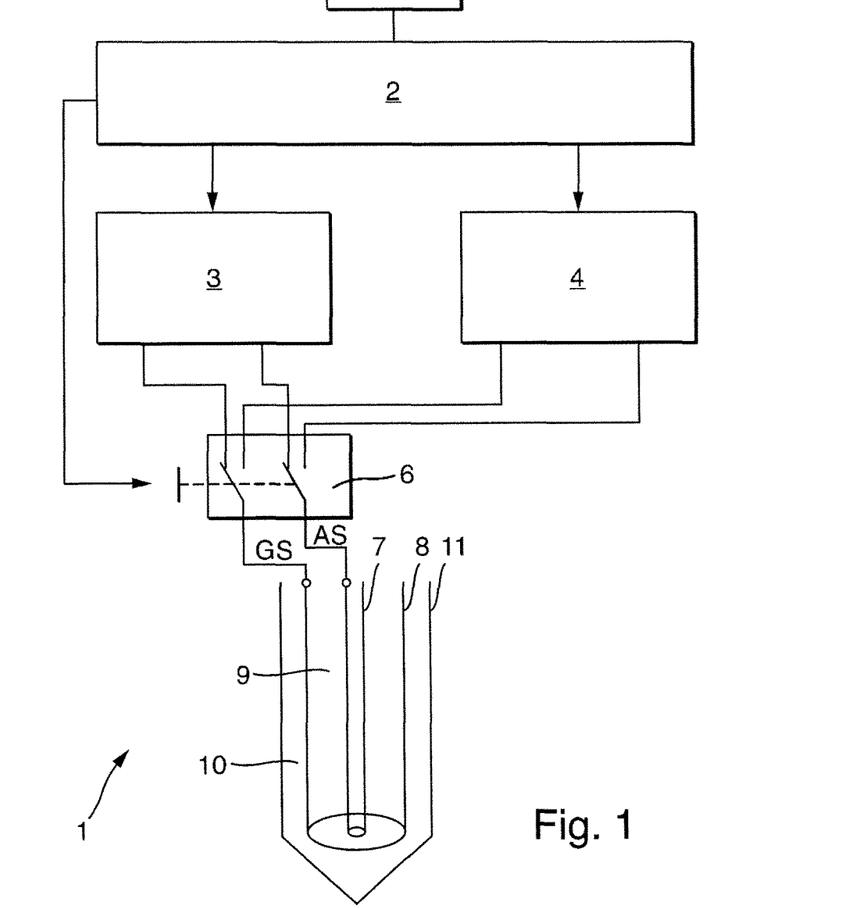
FIG. 1 shows a schematic diagram of an embodiment of the apparatus according to the invention.

FIG. 1 shows a schematic diagram of a preferred embodiment of the apparatus according to the invention to monitor a set filling level of a medium in a container. The apparatus according to the invention comprises a filling level measuring probe 1 that is designed so that it can be used as a conductive filling level measuring probe 1 in a conductive operating mode, and as a capacitive filling level measuring probe 1 in a capacitive operating mode I. By means of the control unit 2, in the case shown designed as an integral component of a control/evaluation/output unit 2, the filling level measuring probe 1 is alternately triggered to operate in conductive operating mode II and in capacitive operating mode I. It goes without saying that the individual components of the control/evaluation/display unit 2 may also be designed as separate partial components.

Figure 2A:
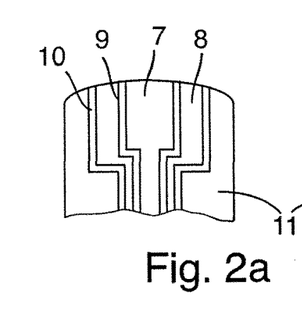
FIG. 2a: shows a partial view of a longitudinal section of a filling level measuring probe.
Figure 2B:
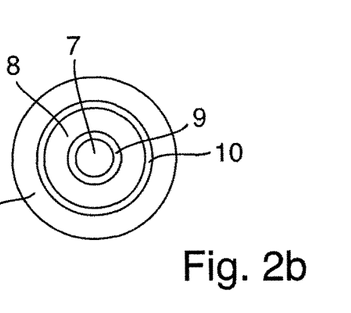

The filling level measuring probe 1 has the same sensor electrode 7, guard electrode 8 and measuring electrode 11 for use in conductive operating mode and capacitive operating mode. The filling level measuring probe 1 is preferably installed front-flush, or almost front-flush, into the wall of the container at the height of the filling level to be monitored. The container is provided with reference sign 11 in FIG. 1. Corresponding filling level measuring probes 1 for the detection of threshold levels are offered and distributed by the applicant under the name of FTW33. If the container is made of conductive material—as shown in FIG. 1—the measuring electrode 11 may be formed by the container wall. Naturally, the measuring electrode 11 may also be designed as an integral part of the filling level measuring probe 1 in containers with walls of non-conductive material. The respective embodiments are shown in FIG. 1 (wall as a ground electrode 11) and in FIG. 2a, FIG. 2b (ground electrode 11 as an integral component of filling level measuring probe 1). It is also possible to provide a separate electrode as a ground electrode.

A first electronic unit 3 operates the filling level measuring probe 1 in conductive operating mode; a second electronic unit 4 activates the capacitive operating mode I of the filling level measuring probe 1.

The preferred alternating triggering of conductive operating mode (range II in FIG. 5) and the capacitive operating mode (range I in FIG. 5) which at least at the initial phase is used to determine the permittivity of the medium or for a plausibility check in the operating modes is performed by a switch unit 6. The switch unit 6 is either designed as an analog switch unit or a digital switch unit. The filling level measuring probe 1 is controlled by the control signal AS for the sensor electrode 7, and the guard signal GS for the guard electrode 8, level measuring probe.

One example of an embodiment of the electronic unit 3 for a conductive filling level measuring probe 1 is, for example, realized in the above-mentioned filling level measuring probe FTW33 by the applicant, which is especially designed for use in the food sector. Suitable electronic units 3 have furthermore been disclosed in German Patent, DE 10 2006 047 780 A1 and German Patent, DE 10 2008 043 412 A1. The functioning of the filling level measuring probe 1 in conductive operating mode is described in FIGS. 2 and 3 of German Patent, DE 10 2006 047 780 A1. The description is explicitly included in the subject matter disclosed in the present invention.

Electronics may be used as the electronic unit 4 for the capacitive operating modelike those used in one of the capacitive filling level probes the applicant offers and distributes under the name of LIQUICAP, Nivector or Multicap.

Figures 3, 4:
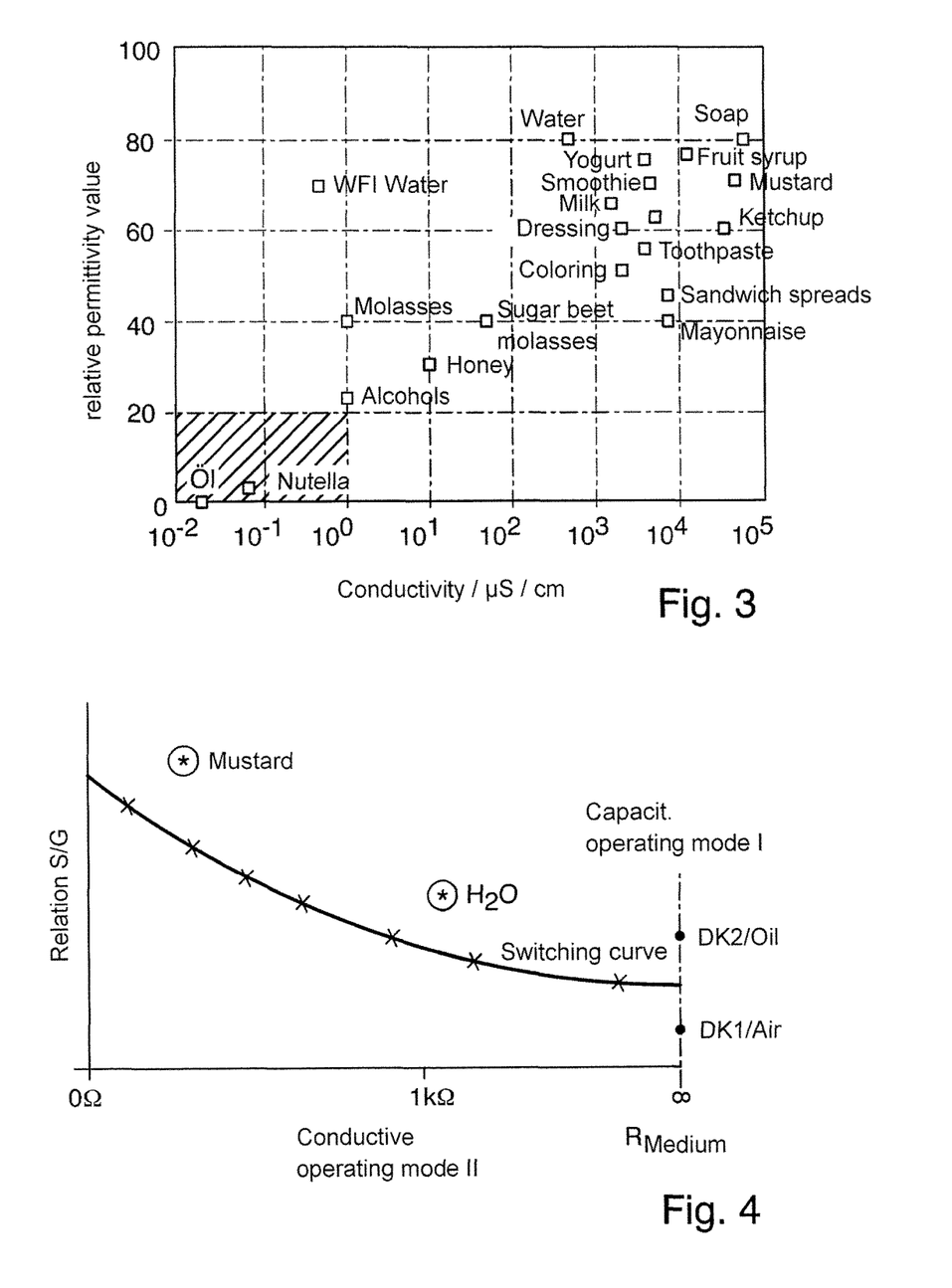
FIG. 3: shows a diagram that shows the permittivity of various media from the food sector depending on the electrical conductivity.
FIG. 4: shows a schematic diagram of switching curves of a filling level measuring probe.

Based on the measured values determined in capacitive operating mode and in conductive operating mode, the control/evaluation/output unit 2 determines whether the set filling level of the medium in the container has been reached. If the set filling level is exceeded and/or undershot, a respective message is generated and, if required, a switching procedure triggered. The switch point is determined depending on the conductivity and/or the relative permittivity of the medium. At least one switching curve is saved in the memory unit 5. If the conductivity of the medium is known, the respective ideal switch point can be determined on the basis of the switching curve saved. FIG. 4 shows a schematic diagram of a switching curve. Another example of a switching curve applicable in connection with the solution according to the invention is shown in the above-cited DE 10 2006 047 780 A1.

According to an advantageous embodiment of the method according to the invention and/or the apparatus according to the invention for monitoring the filling level, three ranges I, II, II can be distinguished:

for non-conductive media or media with a low conductivity, the measured values are used that have been determined in capacitive operating mode (range I). Range I is preferably in the resistance range between 300 kΩ and infinity.

for media to be monitored that have a high electrical conductivity, the measured values are used that are obtained in conductive operating mode (range II). Range II is preferably in the resistance range between 0Ω and to 1 MΩ.

for media to be monitored that have a conductivity in an intermediate range (III), those measured values are used that are determined in capacitive operating mode and in conductive operating mode. Depending on the conductivity, the measured values are provided with suitable weighting factors. In the depicted case, these weighting factors lie between 0% and 100% both for capacitive operating mode I and conductive operating mode II, although they run counter to each other. Range III is preferably in a resistance range between 300 kΩ and 1 MΩ.

Based on the measured values determined in capacitive operating mode and conductive operating mode, it is possible in a preferred embodiment of the method according to the invention to perform a plausibility check.

Figure 5:
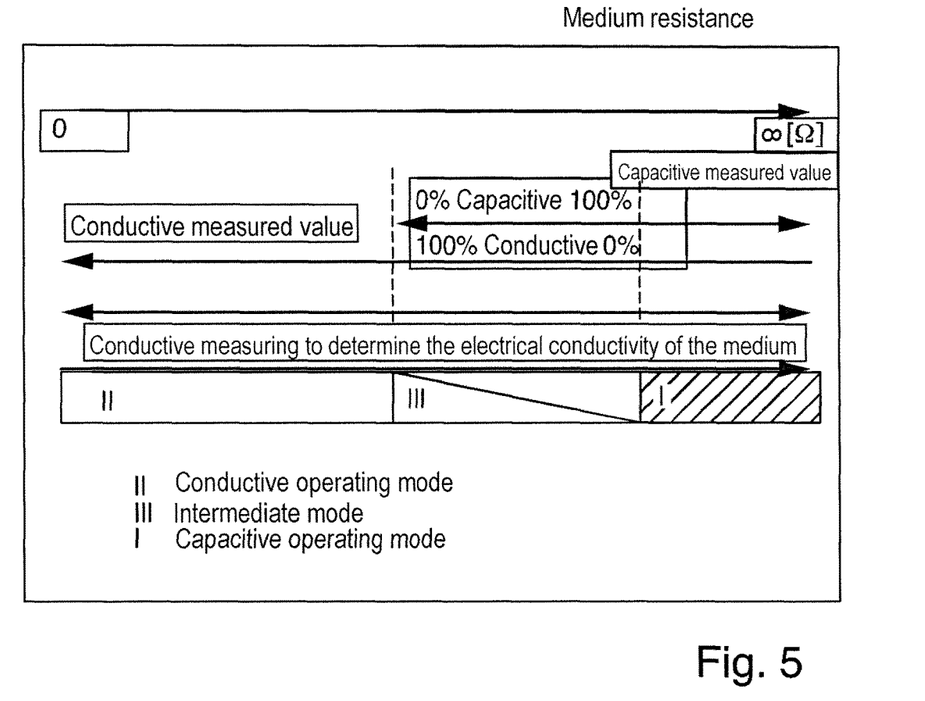
FIG. 5: shows a schematic diagram of the various operating modes.

In connection with the invention, the procedure is such that the guard voltage is measured first in conductive operating mode independent of the medium. The guard voltage describes the conductivity or the resistance of the medium. In FIG. 3, the relative permittivity of various foods is plotted against the conductivity. If the resistance of the medium is known, by using FIG. 5, it is also known in which of ranges I, II or III the following measurements are found:

in range I which is used to exclusively determine measured values in capacitive operating mode, in range III which is used to exclusively determine measured values in conductive operating mode, or in the intermediate range III which is used to form the measured values for filling level monitoring by appropriately weighting the measured values in capacitive operating mode I and in conductive operating mode II.

When measuring in conductive operating mode, the measured value always depends on the relation between the sensor voltage (the voltage measured at sensor electrode 9) and the guard voltage (voltage measured at the guard electrode 10). Once again, reference is made in this context to the subject matter disclosed in DE 10 2006 047 780 A1.

In case of non-conductive media, only measurement in capacitive operating mode is used. This measured value depends on the permittivity of the medium. Between them is the intermediate range III where the measured values obtained in the conductive/capacitive operating modes are offset and/or weighted against each other. In order for the weighting to be gradual and without leaps, the measured values determined in capacitive operating mode and conductive operating mode are weighted proportionally from 100% to 0% and respectively from 0% to 100%.

Figure 6:
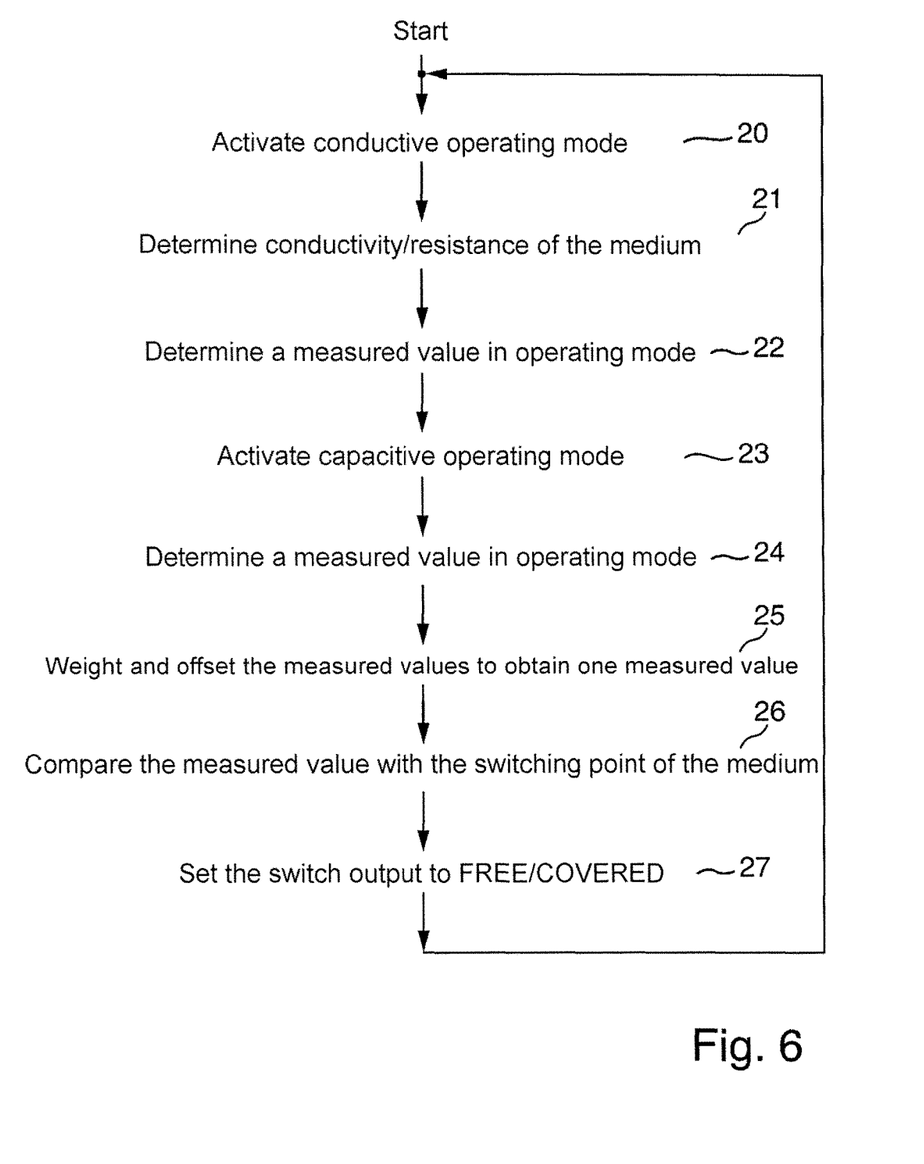
FIG. 6: shows a flow chart for conducting a first embodiment of the method according to the invention.

FIG. 6 shows a flow chart for conducting a first embodiment of the method according to the invention. Once the program is started, program stage 20 activates the conductive operating mode II. Then the conductivity or the resistance of the medium is determined (program stage 21). Subsequently, in program stage 22, a measured value is determined in conductive operating mode.

For program stage 23, the capacitive operating mode I is activated, and program stage 24 determines the respective measured value. Furthermore, the switch point is determined on the basis of the saved switching curve as portrayed for example in FIG. 4. Based on the dependency saved in FIG. 5, the range I, II or III required for monitoring the set filling level is determined. If the intermediate range III is applicable, the appropriate weighting factors for conductive operating mode II and capacitive operating mode I are determined.

At stage 25, the determined measured values are correspondingly weighted, and a measured value is calculated which is compared with the corresponding switching point of the medium in program stage 26. As a result of the comparison with the switching curve saved (program stage 27), the switch output is set to "sensor free" or "sensor covered". The program then jumps back to program stage 20 and proceeds to repeat the program loop 20 to 27.

Figure 7:
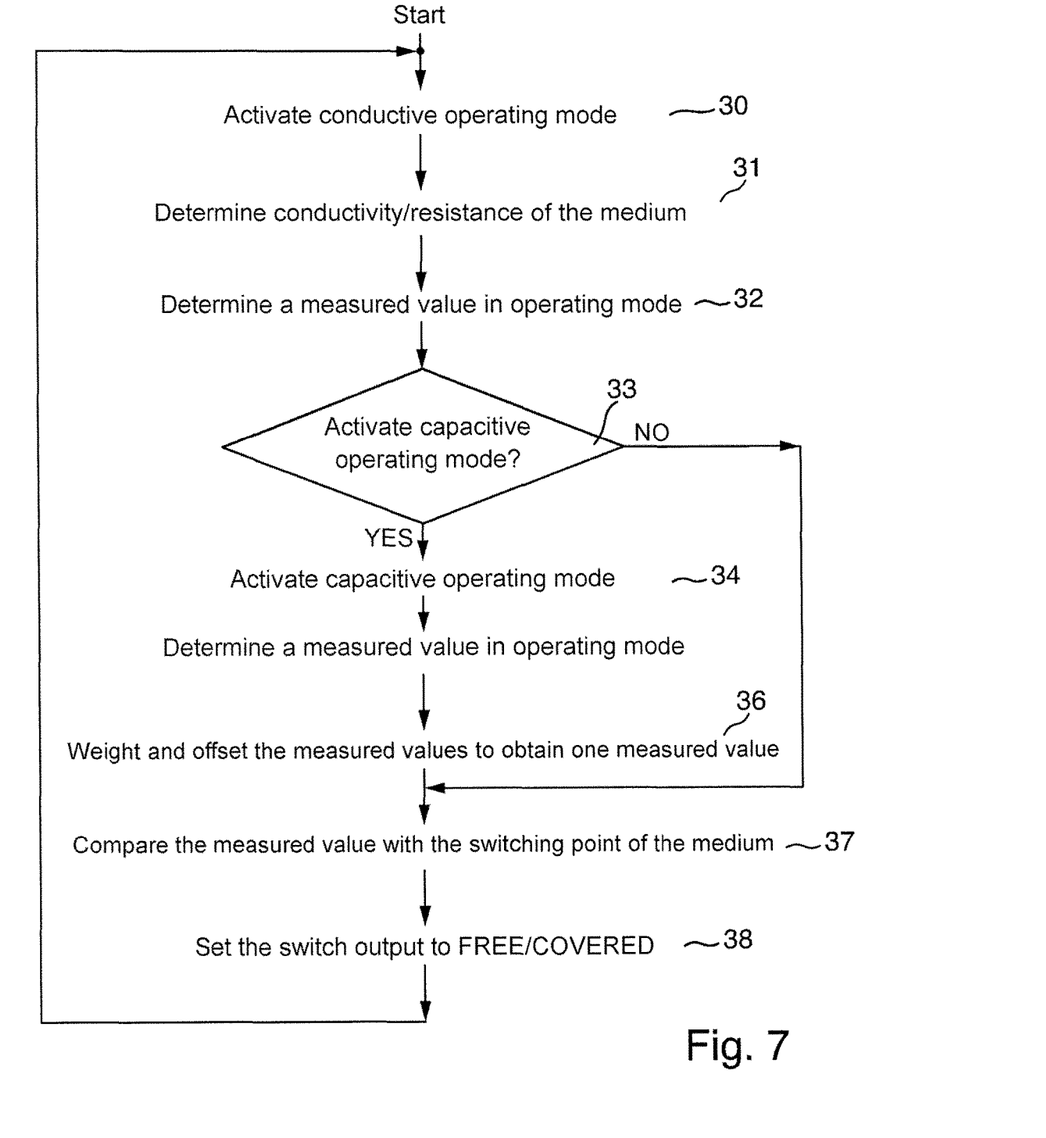
FIG. 7: shows a flow chart for conducting a second embodiment of the method according to the invention.

FIG. 7 shows a flow chart for conducting a second advantageous embodiment of the method according to the invention. This embodiment of the method according to the invention covers the case in which the determination of conductivity in conductive operating mode reveals that it sufficient to determine the measured values for filling level measuring probe 1 in conductive operating mode only. In this case, the capacitive operating mode does not render usable measured values. Thus, program stages 34 to 36 may be skipped, which can at least double the time for providing the measured values. As soon as a measurement in conductive operating mode shows that conductivity has changed, the decision is made in stage 33 as to whether or not capacitive operating mode must be activated.

The invention claimed is:

1. An apparatus for monitoring a set fill level of a medium in a container, comprising:
a fill level measuring probe that is designed to operate as a conductive fill level measuring probe in a conductive operating mode and as a capacitive fill level measuring probe in a capacitive operating mode, with:
a control/evaluation/output unit that is designed to:
alternately trigger the conductive operating mode and the capacitive operating mode, wherein:
said control/evaluation/output unit determines whether the set fill level of the medium in the container has been reached on the basis of the measured values from the two operating modes, and which generates a message when the set fill level is exceeded and/or undershot; and
said fill level measuring probe having a sensor electrode and a guard electrode, with a first electronic unit being provided that is designed to operate said fill level measuring probe in said conductive operating mode, with a second electronic unit being provided that is designed to operate said fill level measuring probe in said capacitive mode;
a switching unit is provided that is used by said control/evaluation/output unit to alternately activate conductive operating mode and capacitive operating mode of said fill level measuring probe; and
said first electronics unit or said second electronic unit supplying said sensor electrode with a control signal or said guard electrode with a guard signal depending on the triggered operating mode.

2. The apparatus according to claim 1, wherein:
said control/evaluation/output unit determines whether the set filling level is exceeded and/or undershot on the basis of a tappable signal resulting from said sensor electrode and said control signal and/or the guard signal.

3. The apparatus according to claim 2, wherein:
at least one measuring resistor is provided that is used to tap the ratio of guard current to sensor electrode current.

4. The apparatus according to claim 2, wherein:
said control/evaluation/output unit determines at least a gain from the guard signal and/or the control signal and the current signal, and/or a voltage signal depending on the current signal, and determines whether the fill level of the medium in the container is exceeded or undershot on the basis of the gain.

* * * * *